United States Patent [19]
Oshida

[11] Patent Number: 4,840,523
[45] Date of Patent: Jun. 20, 1989

[54] SECURING DEVICE

[75] Inventor: Tsutomu Oshida, Kamagaya, Japan

[73] Assignee: Nifco, Inc., Yokohama, Japan

[21] Appl. No.: 213,851

[22] Filed: Jun. 30, 1988

[30] Foreign Application Priority Data

Jul. 16, 1987 [JP] Japan .................. 62-109351

[51] Int. Cl.$^4$ ............................................. F16B 13/06
[52] U.S. Cl. ...................................... 411/48; 411/60;
411/72; 411/908
[58] Field of Search .................. 411/21, 45–48,
411/41, 40, 60, 908, 71–73, 509, 510, 57

[56] References Cited

U.S. PATENT DOCUMENTS

| 2,968,207 | 1/1961 | Flogaus | 411/60 |
| 3,832,931 | 9/1974 | Talan | 411/72 |
| 4,312,614 | 1/1982 | Palmer et al. | 411/41 |
| 4,637,765 | 1/1987 | Omata | 411/41 |
| 4,674,930 | 6/1987 | Poe et al. | 411/40 |

FOREIGN PATENT DOCUMENTS 48-13144 4/1973 Japan .................. 411/60

61-166212 10/1986 Japan .................. 411/60

Primary Examiner—Neill R. Wilson
Attorney, Agent, or Firm—Schwartz & Weinrieb

[57] ABSTRACT

A securing device includes an outer cylinder having a hollow cylindrical portion with a flange provided at one end, and an insertion member having a rod-like portion to be inserted into the outer cylinder. The hollow cylindrical portion of the outer cylinder has a plurality of slits open at the other end, an inwardly projecting portion provided at the other end, and a plurality of engagement ribs projecting outwardly from the outer periphery of the cylindrical portion. A rod-like portion of the insertion member has a head portion provided at one end, an intermediate large diameter portion having an outer diameter which is greater than the inner diameter of the inwardly projecting portion of the outer cylinder, and a small diameter portion having an outer diameter smaller than the inner diameter of the inwardly projecting portion of the outer cylinder. The small diameter portion is provided upon the side of the large diameter portion which is located nearer the head portion of the insertion member.

4 Claims, 6 Drawing Sheets 4,840,523

SECURING DEVICE

FIELD OF THE INVENTION

This invention relates to a securing device for securing together two plates in an overlapped state and, more particularly, to a securing member, for securing together plates, which is not limited to use with plates of a specific combined thickness.

BACKGROUND OF THE INVENTION

Japanese Utility Model Public Disclosure No. Sho 60-173712 discloses a securing device, which can secure together two plates and is not limited to use with plates of a specific combined thickness.

Also, Japanese Utility Model Public Disclosure No. Sho 60-173712 discloses a securing device which is provided with a plurality of engagement ribs provided upon the external peripheral surface thereof in order to be able to secure two plates together, and again which is not limited to use with plates of a specific thickness (as shown in FIGS. 6 and 7).

This securing device, as shown in FIGS. 6 and 7, comprises an outer cylinder 1 having the outer periphery thereof provided with a plurality of engagement ribs 2. With an insertion member 4 slightly inserted within the outer cylinder 1 (as shown in FIG. 6), the securing device is inserted through mounting holes A1 and B1 respectively provided within two overlapped plates A and B, and a flange 3 of the outer cylinder 1 is brought into contact with the upper surface of the upper plate A. Then, as shown in FIG. 7, the insertion member 4 is forcibly inserted into the outer cylinder 1 until a flange portion 5 of the insertion member 4 strikes the flange portion 3 of the outer cylinder 1. Consequently, the leading end of the insertion member 4 engages the inner wall of the outer cylinder 1 and spreads the cylinder 1 radially outwardly. Thus, the engagement ribs 2 are strongly urged against the edge of the mounting hole B1 of the lower plate B. In this manner, the lower plate B is secured to the upper plate A.

Since the outer cylinder 1 is provided with a plurality of engagement ribs 2, two plates can be secured together irrespective of the thickness of the plates.

With the prior art securing device having the aforenoted structure, the insertion member 4 has to be pulled upwardly in order to remove the device from the plates within which it is secured as shown in FIG. 7. However, the removal is very difficult since the flange 3 of the outer cylinder 1 and flange 5 of the insertion member 4 are disposed in close contact with each other. Further, more if the device receives strong vibrations over a long period of time while disposed in the secured state shown in FIG. 7, it is likely that the insertion member 4 will become loosened whereby, in turn, the plates A and B will be detached or loosened.

OBJECT OF THE INVENTION

An object of the invention is to provide a securing device, which can reliably hold two plates secured together in a state which is readily releasable from the secured state.

SUMMARY OF THE INVENTION

In order to attain the above object of the invention, there is provided a securing device which comprises an outer cylinder having a hollow cylindrical portion with a flange portion provided at one end thereof, the cylindrical portion having a plurality of slits open at the other end thereof, an inwardly projecting portion provided at the other end and a plurality of engagement ribs projecting outwardly from the outer periphery of the cylindrical portion, and an insertion member having a rod-like portion to be inserted into the outer cylinder, the rod-like portion having a head portion provided at one end thereof, an intermediate large diameter portion having an outer diameter which is greater than the inner diameter of the inwardly projecting portion of the outer cylinder and which is engaged by means of the inwardly projecting portion, and a small diameter portion provided upon the side of the large diameter portion which is disposed nearer the head portion and which has an outer diameter smaller than that of the inner diameter of the inwardly projecting portion.

With the securing device having the aforenoted construction, by inserting the outer cylinder with the insertion member partly inserted therein through mounting holes of two overlapped plates and then pushing the insertion member from the head portion and upon the rear side thereof so that it proceeds through the bore of the outer cylinder from the side of the flange thereof until the large diameter portion of the rod-like portion reaches the inwardly projecting portion of the outer cylinder, the outer cylinder is spread radially outwardly due to the provision of the slits so that the engagement ribs disposed upon the outer periphery of the outer cylinder are urged against the inner peripheral surfaces of the mounting holes, whereby the two plates are secured together.

When the insertion member is pushed further into the hollow cylinder so that the large diameter portion of the insertion member clears the inwardly projecting portion of the outer cylinder and the small diameter portion of the insertion member reaches the inwardly projecting portion of the outer cylinder, the outer cylinder restored to its initial state from the radially expand spread state, and the engagement ribs separate from the inner peripheral walls of the mounting holes whereby the secured state is released.

As has been shown, the two plates are secured together as a result pushing the insertion member into the outer cylinder, and as a result of pushing the insertion member further into the outer cylinder from its position within the secured state, the securing device is released from the plates. In this way, the securing device according to the invention can be readily secured and released.

BRIEF DESCRIPTION OF THE DRAWINGS

The above and other objects and features of the invention will become more apparent from the following detailed description with reference to the accompanying drawings, wherein:

FIG. 2(*b*) is a front view showing the outer cylinder of FIG. 1;

FIG. 2(*c*) is a sectional view taken along line IIc-IIc in FIG. 2(*b*);

DETAILED DESCRIPTION OF THE PREFERRED EMBODIMENT

Figure 1:
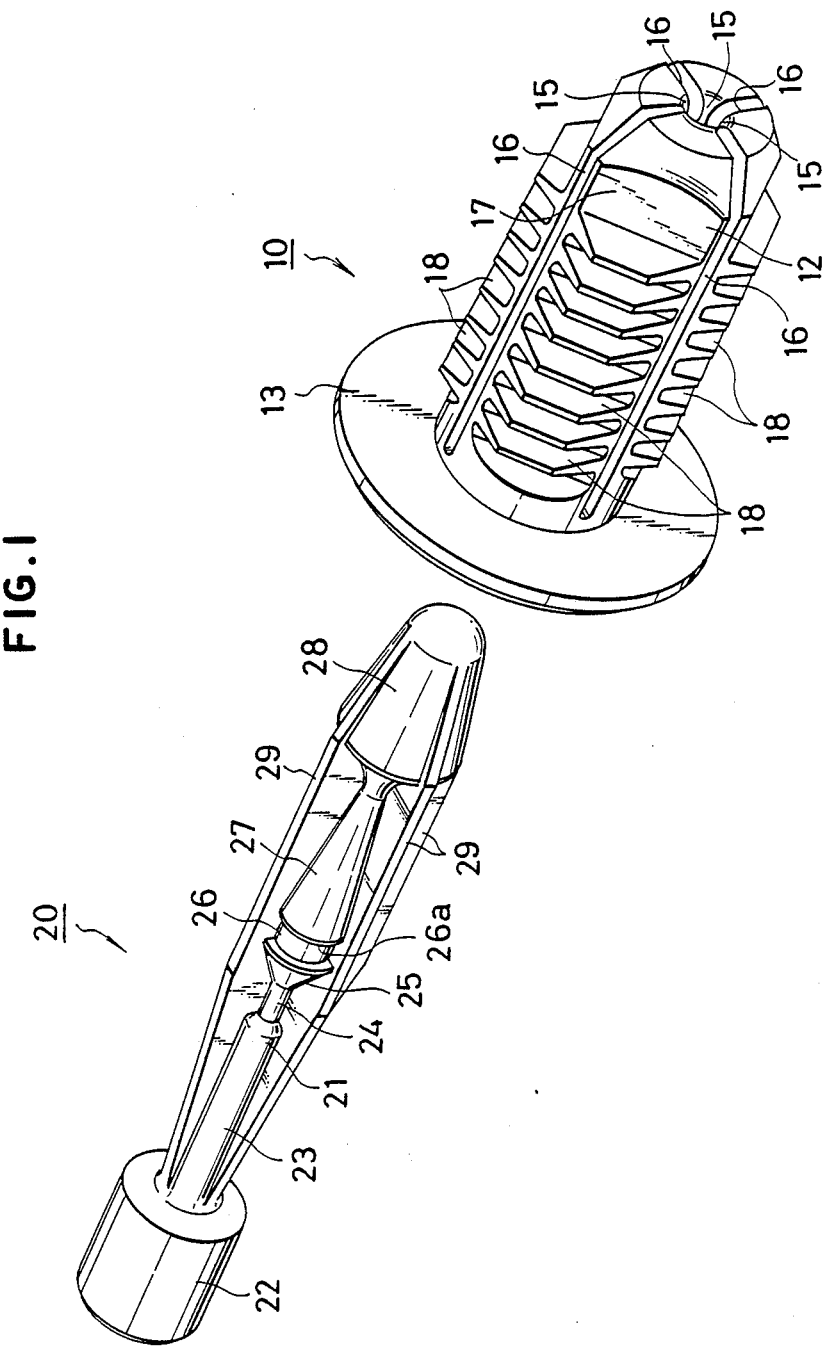
FIG. 1 is a perspective view showing an embodiment of the securing device according to the invention with an outer cylinder and an insertion member shown separated from each other.

FIGS. 1 to 5 illustrate an embodiment of the securing device constructed according to the invention. The securing device comprises an outer cylinder 10 and an insertion member 20 inserted thereinto. These components are respective plastic moldings.

The outer cylinder 10 comprises a cylindrical portion 12 having a bore 11 of a circular sectional profile and a circular outer flange 13 provided at one end of the cylindrical portion 12.

The bore 11 has a large diameter portion 11a extending from the side of the flange 13 up to a shoulder 14, a small diameter portion 11b extending from the shoulder 14 toward the opposite end and a tapering portion 11c extending from the small diameter portion 11b and tapering toward the opposite end. At the leading end of the bore 11, the inner wall thereof has an inwardly projecting annular portion 15.

The cylindrical portion 12 has four slits 16 circumferentially dividing it at intervals of 90° and open upon the side of the inwardly projecting portion 15.

Figure 2A:
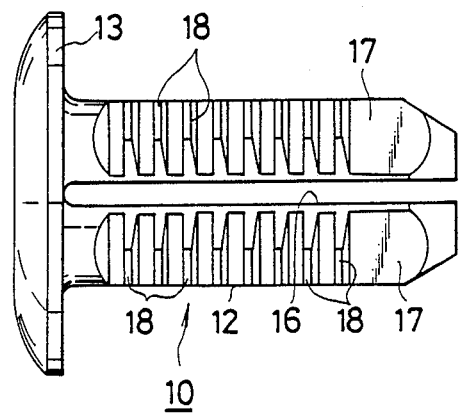
FIG. 2(*a*) is a right side view showing the outer cylinder of FIG. 1.
Figure 2B:
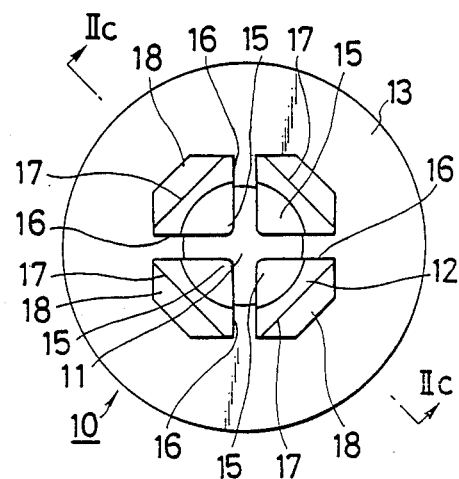
Figure 2C:
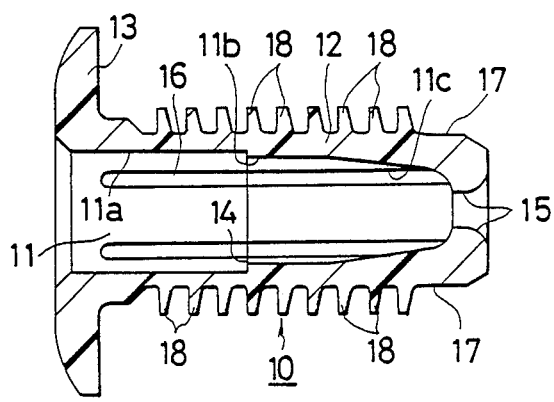

The outer periphery of the cylindrical portion 12 which is divided by means of the slits 16 into four divisions or quadrants is formed with flat surfaces 17, adjacent ones of which are perpendicular to each other, as shown in FIGS. 1 and 2(b).

Each flat surface 17 has projecting therefrom a plurality of trapezoidal engagement ribs 18 whose top surfaces are disposed parallel to the flat surface 17.

The insertion member 20 has a rod-like portion 21 and a head portion 22 provided at an end of the rod-like portion 21.

The head portion 22 is cylindrical with the outer diameter being slightly smaller than the inner diameter of the large diameter portion 11a of the bore 11 of the outer cylinder 10.

Figure 5A:
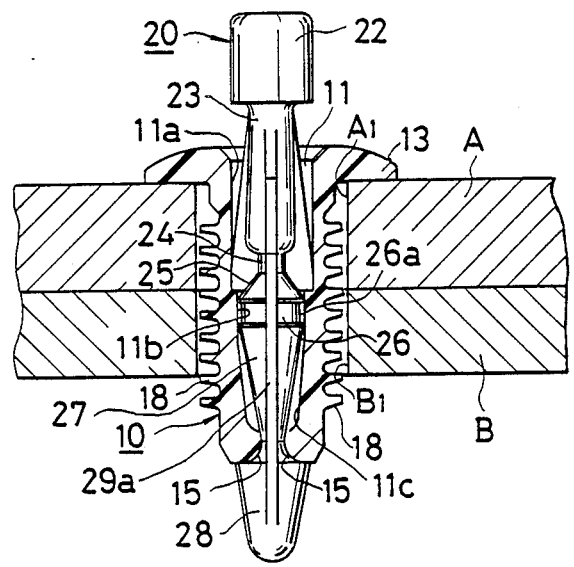
FIG. 5(a) is a sectional view showing the securing device with the insertion member inserted into the outer cylinder.
Figure 5B:
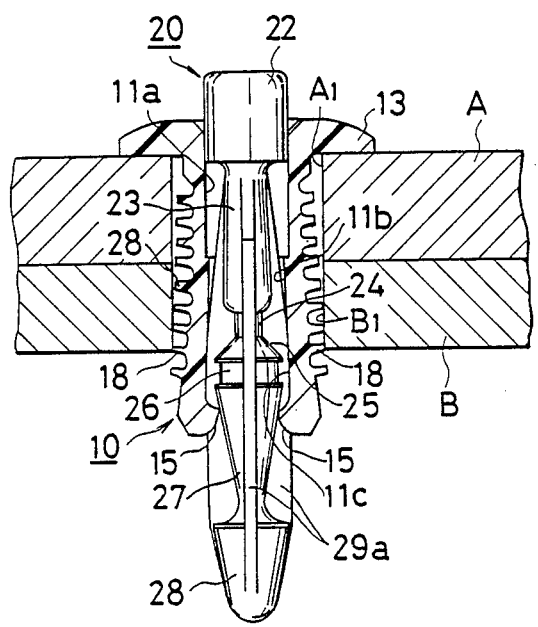
FIG. 5(b) is a sectional view showing the securing device with the insertion member inserted within the outer cylinder such that the outer cylinder is being expanded radially outwardly.
Figure 5C:
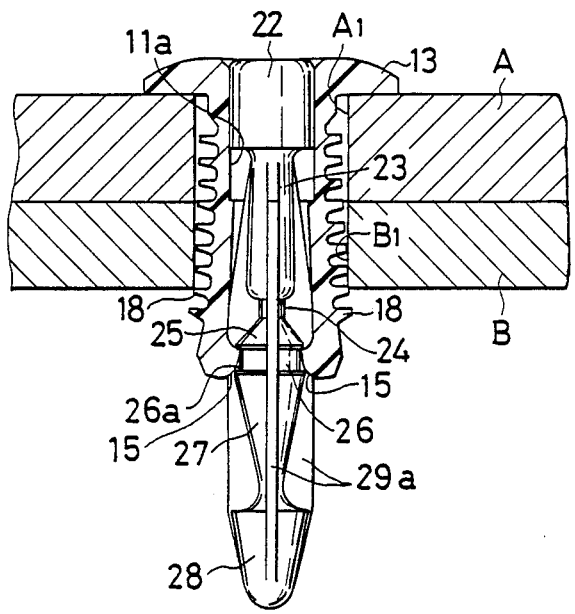
FIG. 5(c) is a sectional view showing the securing device with the insertion member inserted within the outer member so as to fully secure two plates together.
Figure 5D:
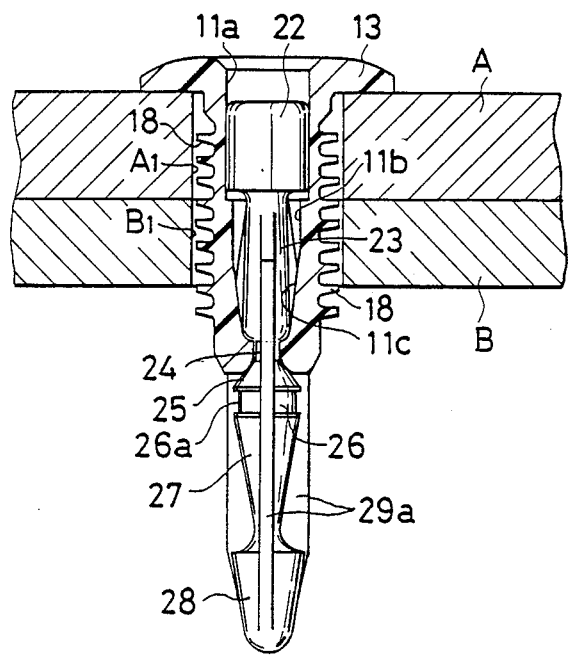
FIG. 5(d) is a sectional view showing the securing device having been released by pushing the insertion member axially further through the outer cylinder.
Figure 6:
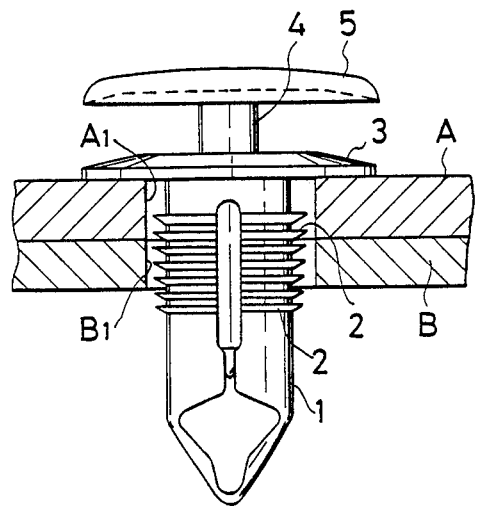
FIG. 6 is a front view showing a well-known securing device.
Figure 7:
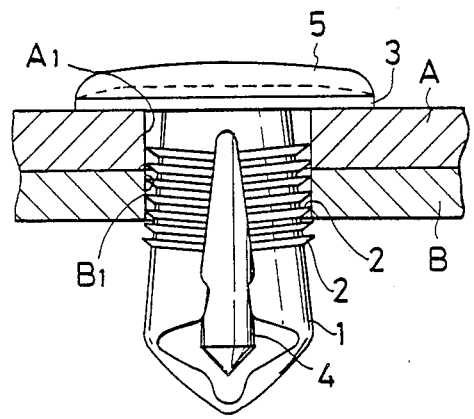
FIG. 7 is a view showing the well-known securing device of FIG. 6 securing together two plates.

The rod-like portion 21 has a stem portion 23 having a circular sectional profile with the diameter progressively increasing toward the other end and being slightly smaller than the inner diameter of the lower end of the tapering portion 11c of the bore 11 of the outer cylinder 10 as shown in FIG. 5(d), a small diameter portion 24 having a circular sectional profile with the outer diameter thereof being slightly smaller than the inner diameter of the inwardly projecting portion 15 when the portion 15 is disposed in its natural or re- stored, non-expanded state, a first tapering portion 25 having a circular sectional profile with the outer diameter thereof rapidly increasing toward the other end and yet being slightly smaller, even at the largest diameter portion thereof, than the inner diameter of the small diameter portion 11b of the bore 11 of the outer cylinder 10 as shown in FIG. 5(a), a large diameter portion 26 having a circular sectional profile with the outer diameter thereof being slightly smaller than the inner diameter of the small diameter portion 11b of the bore 11 of the outer cylinder 10, a second tapering portion 27 having a circular sectional profile with the outer diameter thereof being progressively reduced toward the other end of the insertion member and also being slightly smaller than the inner diameter of the inwardly projecting portion 15 of the outer cylinder 10 as shown in FIG. 5(a), and an end portion 28 having a circular sectional profile with the outer diameter thereof being progressively reduced toward the other end of the insertion member.

The large diameter portion 26 of the insertion member 20 has its outer periphery formed with an annular groove 26a.

Figure 3:
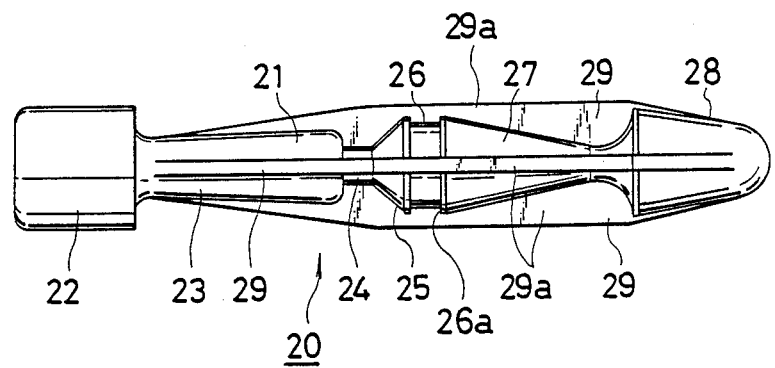
FIG. 3 is a right side view showing the insertion member of FIG. 1.

As shown in FIGS. 1 and 3, the rod-like portion 21 is provided with four guide ridges 29 which are adapted to be fitted within the respective four slits 16 of the cylindrical portion 12. The guide ridges 29 are circumferentially spaced apart at intervals of 90°. Each guide ridge 29 has opposite inclined end portions which are inclined toward the axis of the rod-like portion 21 as one approaches the head portion 22 and also as one approached the end portion 28. The central portion 29a is disposed parallel to the axis of the rod-like portion 21.

The distance defined between the radially outer edges of the central portions 29a of two guide ridges 29 spaced apart at an interval of 180° is set to be slightly smaller than the inner diameter of the large diameter portion 11a of the bore 11 of the cylindrical portion 12 so that the insertion member 20 can be inserted into the outer cylinder 10 from the flanged end thereof.

The operation of the securing device having the aforenoted structure will now be described.

First, when the insertion member 20 is inserted from its separated state shown in FIG. 1 into the bore 11 of the outer cylinder 10 through the flanged end thereof with its guide ridges 29 held in registry with the slits 16 of the outer cylinder 10, the guide ridges 29 are engaged within the slits 16.

Figure 4:
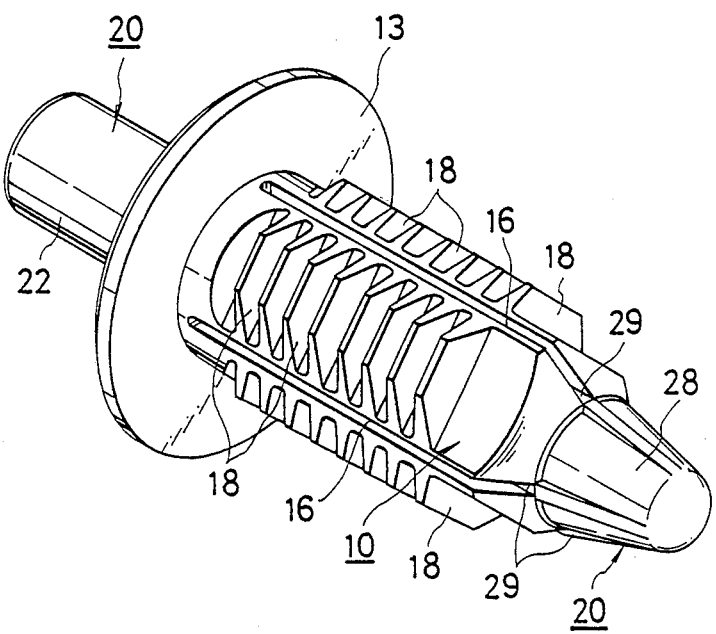
FIG. 4 is a perspective view showing the securing device of FIG. 1 with the insertion member inserted within the outer cylinder.

By strongly pushing the insertion member 20 while disposed in this state, it is advanced under the guidance of the guide ridges 29 and slits 16, and its end portion 28 progressively comes into engagement with the walls of the small diameter portion 11b, tapering portion 11c of the bore 11 and inwardly projecting portion 15 of the cylindrical portion 12, so that the downstream end portion of the cylindrical portion 12 is progressively spread radially outwardly due to the elasticity thereof as a result of the presence of the slits 16, so that the end portion 28 eventually clears the cylindrical portion 12. Consequently, the cylindrical portion 12 is restored to the initial state as shown in FIGS. 4 and 5(a), with the inwardly projecting portion 15 located at the lower end of the second tapering portion 27. In this state, the insertion member 20 is coupled to the outer cylinder 10 such that it cannot be withdrawn.

The securing device having its two components coupled together in the aforenoted way is then inserted through mounting holes A1 and B1 of the two overlapped plates A and B so as to bring the flange 13 into engagement with the plate A, as shown in FIG. 5(a).

When the head portion 22 of insertion member 20 is pushed still further into the outer cylinder 10 as shown in FIG. 5(b), the inwardly projecting portion 15 is spread radially outwardly by means of the second tapering portion 27 with the end of the cylindrical portion 12 progressively spread radially outwardly as permitted by the elasticity thereof as a result of the provision of the slits 16. As the head portion 22 is pushed still further into outer cylinder 10, the inwardly projecting portion 15 is disposed within the annular groove 26a of the large diameter portion 26 as shown in FIG. 5(c). The engagement ribs 18 defined upon the outer periphery of the cylindrical portion 12 having been moved radially outwardly in accordance with the aforenoted radial expansion of the cylindrical portion 12 strongly engage with the inner peripheral surface and lower edge portion of the mounting hole B1, thus securing together the two plates A and B. Since the cylindrical portion 12 is provided with a plurality of engagement ribs 18, plates A and B of various combined thicknesses can be secured together.

With the two plates secured together, the inwardly projecting portion 15 is disposed within the annular groove 26a. Therefore, even if the plates A and B continuously receive strong vibrations, the insertion member 20 will not become loosened, and the plates A and B will not be detached from each other.

In order to release the secured state of the securing device shown in FIG. 5(c), the head portion 22 is pushed still further into the cylindrical portion 12 of the outer cylinder 10 so as to cause the large diameter portion 26 to project from or be disposed axially beyond the inwardly projecting portion 15. In consequence, the inwardly projecting portion 15 is located within the small diameter portion 24, so that the cylindrical portion 12 is elastically restored to the initial state, and the engagement ribs 18 are separated from the internal peripheral surfaces of the mounting holes A1 and B1 so as to release the securement of the plates A and B.

In order to re-use the securing device from the released state shown in FIG. 5(d), the insertion member 20 is moved in the reverse direction by means of a force impressed upon the end portion 28 so as to restore the state shown in FIG. 5(a).

While an embodiment of the invention has been described in the foregoing, the construction of the embodiment described above is by no means limited by means of the particular structure illustrated, and various changes and modifications may be made. Furthermore, the securing device may be used for securing objects other than plates.

As has been described in the foregoing, with the securing device constructed according to the invention the secured state can be readily released by means of further movement of the insertion member 20 from the secured state shown in FIG. 5(c). Furthermore, since the inwardly projecting portion 15 is disposed within the large diameter portion 26 in the secured state shown in FIG. 5(c), it is possible to prevent any change in the secured state due to such causes as vibration.

What is claimed is:

1. A securing device to be inserted within holes defined within at least two plates to be secured together, comprising:
    an outer cylinder having a hollow cylindrical portion with a flange provided at one end, an inwardly projecting portion provided at the other end, a plurality of slits open at said other end and extending axially toward said flanged end so as to divide said hollow cylindrical portion into four quadrants with the outer surface of each quadrant comprising a flat surface disposed substantially perpendicular to the outer surface of each adjacent quadrant, and a plurality of axially spaced engagement ribs, each having the configuration of a trapezoid, projecting outwardly from each of said flat outer surfaces of said quadrants of said cylindrical portion such that the outermost edge surfaces of said trapezoidal ribs are disposed parallel to said flat surfaces of said quadrants of said cylindrical portion whereby each one of said outermost edge surfaces of said trapezoidal ribs are disposed substantially perpendicular with respect to adjacent outermost edge surfaces of said trapezoidal ribs so as to provide the ribbed portion of said outer cylinder with a first substantially square-shaped configuration; and
    an insertion member having a rod-like portion to be inserted into and movable within said outer cylinder, said rod-like portion having a head portion provided at one end, an intermediate large diameter portion having an outer diameter which is greater than the inner diameter of said inwardly projecting portion of said outer cylinder so as to be engaged by said inwardly projecting portion of said outer cylinder in order to radially expand said quadrant portions of said outer cylinder so as to cause said ribs to engage an inner peripheral surface of at least one of said holes of at least one of said plates to be secured together when said insertion member is disposed at a first axial position with respect to said outer cylinder, and a small diameter portion interposed between said large diameter portion and said head portion and having an outer diameter which is smaller than the inner diameter of said inwardly projecting portion of said outer cylinder so as to permit said securing device to achieve a released state with respect to said plates to be secured together when said insertion member is disposed at a second axial position with respect to said outer cylinder.

2. A securing device as set forth in claim 1, wherein: four of said slits are defined within said cylindrical portion of said outer cylinder so as to be equally spaced apart from each other in a circumferential directional spacing of 90°.

3. A securing device as set forth in claim 2, further comprising:
    four axially extending guide ridges integrally formed upon said insertion member at equally spaced locations spaced 90° apart from each other in said circumferential direction for respectively mating with said four slits of said outer cylinder whereby said axial movement of said insertion member within said outer cylinder is controllably guided as a result of cooperation defined between said slits of said outer cylinder and said guide ridges of said insertion member.

4. A securing device as set forth in claim 1, wherein each of said trapezoidal ribs comprises:
    angled edge surfaces interconnecting said outermost edge surfaces and said flat surfaces of said quadrants and disposed at angles of 45° with respect to said outermost edge surfaces and said flat surfaces of said quadrants such that adjacent angled edge surfaces of said quadrants provide said ribbed portion of said outer cylinder with a second substantially square-shaped configuration which is angularly offset with respect to said first substantially square-shaped configuration through means of an angular displacement of 45°.

* * * * *